United States Patent [19]

Miller

[11] 4,171,821
[45] Oct. 23, 1979

[54] QUICK CHANGE COLLET TOOL HOLDER ASSEMBLY

[75] Inventor: Boyd L. Miller, Clinton, Iowa

[73] Assignee: Chamberlain Manufacturing Company, Elmhurst, Ill.

[21] Appl. No.: 878,269

[22] Filed: Feb. 16, 1978

[51] Int. Cl.² .................. B23B 31/10; B23B 31/22
[52] U.S. Cl. ............................ 279/75; 279/1 B; 279/1 ME; 279/1 Q
[58] Field of Search ............ 279/1 B, 1 ME, 1 Q, 279/75, 82, 20, 1 A, 72, 81

[56] References Cited

U.S. PATENT DOCUMENTS

| | | | |
|---|---|---|---|
| 2,990,188 | 6/1961 | Better et al. | 279/75 |
| 3,633,931 | 1/1972 | Bilz | 279/75 |
| 3,989,260 | 11/1976 | Zonkov et al. | 279/1 ME X |

*Primary Examiner*—Z. R. Bilinsky
*Attorney, Agent, or Firm*—Hill, Van Santen, Steadman, Chiara & Simpson

[57] ABSTRACT

A quick change tool holding assembly of the collet type is disclosed wherein a machine spindle carried collet assembly includes gripper members engageable with surfaces of a tool holder carried nut interior of the collet assembly to maintain the nut on the spindle. In order to prevent entry of coolant and other foreign matter into the interior of the collet assembly the assembly is provided with an axially extending circumferential inner diameter land below the gripper members and the nut is provided with a seal member engaging the land.

5 Claims, 4 Drawing Figures

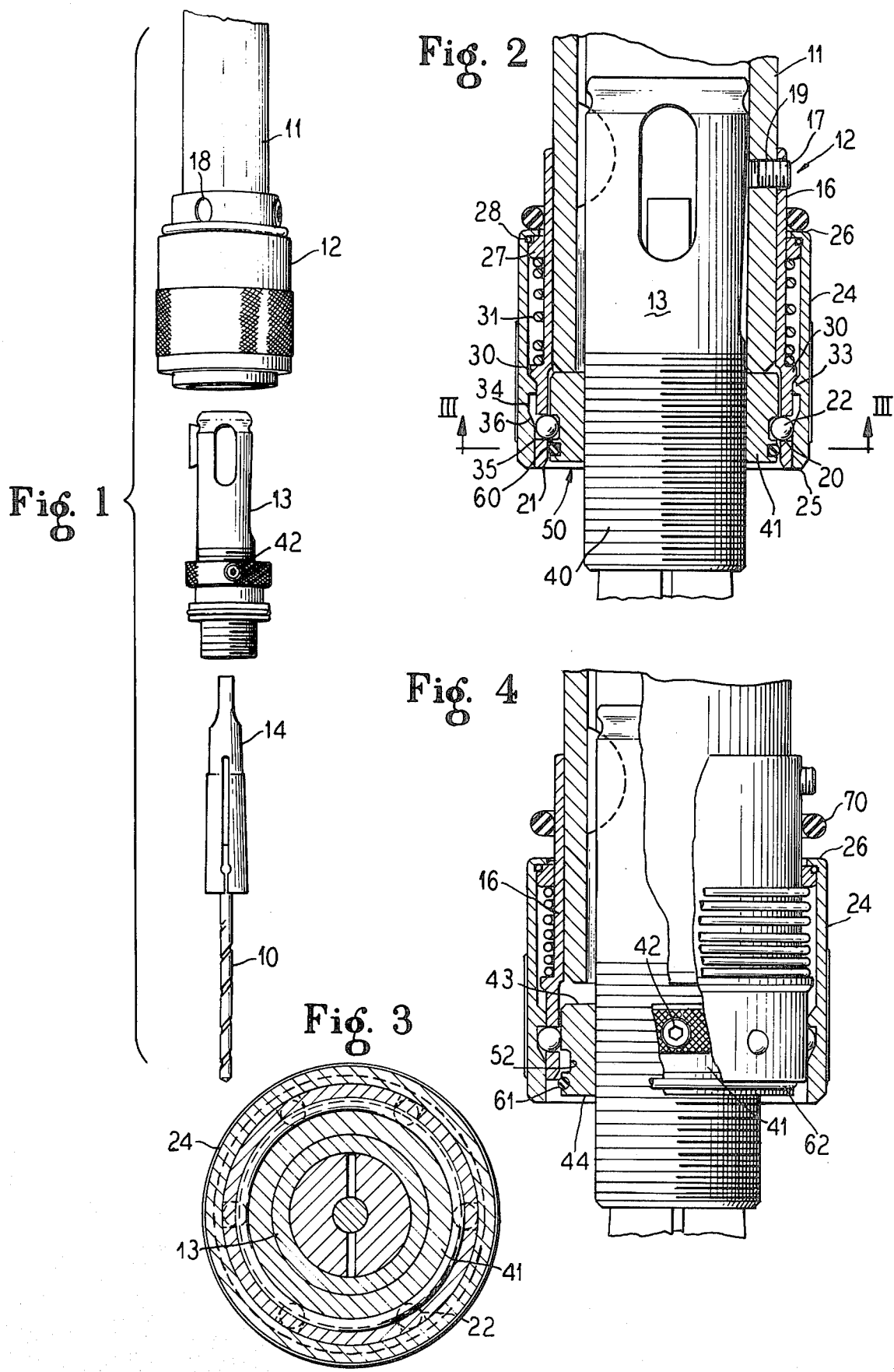

QUICK CHANGE COLLET TOOL HOLDER ASSEMBLY

BACKGROUND OF THE INVENTION

1. Field of the Invention

This invention relates to tool holding devices and more particularly to quick change tool holders of the collet type.

2. Prior Art

Collets have long been used for attaching tools to machine spindles. More recently, particularly with the development of large machine tools, it has been a common practice to interpose a tool holder between the collet and the tool such that a collet affixed to a machine spindle engages a tool holder affixed to the tool.

More recently, quick change tool assemblies have become widespread where the collet is designed to be quickly disengaged to release the tool holder. Finally, in order to allow variance in the projection of the tool holder from the collet, it has been known to provide the tool holder with an adjustable position nut which then becomes the gripping point between the collet and the tool holder.

The gripping members of the collet can be, variously, axially extending circumferentially spaced spring fingers or circumferentially spaced balls radially moveable under the influence of caming surfaces. See for example U.S. Pat. No. 3,790,182. One problem experienced in association with such prior art devices arises from the fact that in order for the quick release features to properly function, it is necessary that the gripping members, whether fingers or balls, completely release the nut upon actuation of the collet release means. However, since the tools are universally used in environments which quickly become polluted during the use of the tool, it is easy for foreign matter, particularly over prolonged periods of use, to invade the assembly. This problem is aggravated when the tool is being operated in an environment requiring the application of a stream of coolant fluid. In such instances, it is possible for the gripping members to become gummed or fouled to an extent that they do not properly release. When this occurs, the entire assembly may have to be removed from the machine tool spindle and be subject to an external cleaning operation in order to free the tool holder from the collet. This problem is aggravated because, typically, the gripping members are operated extremely axially close to the end of the collet assembly, and therefore in proximity to the working environment of the tool.

A further disadvantage with the prior art designs lies in the fact that frequently the nut can provide a fulcrum point about which the tool holder can tend to tilt in the collet assembly. This is particularly true where the tool holder nut is engaged by a circumferential portion of the collet assembly.

It would therefore be an advance in the art to provide a quick change collet tool holder of the type utilizing an adjustable tool holder nut held in working relationship with a machine spindle by engagement of the nut by gripping members carried by a collet assembly affixed to the spindle where the interior of the collet assembly is sealed. It would be another advance in the art to provide such an assembly where any tendency of the nut to allow tilting of the tool holder is substantially reduced or eliminated.

SUMMARY OF THE INVENTION

This invention provides such an improved tool holder wherein the collet assembly is provided with a circumferential axial extending face projecting from the gripping member area towards the tool holder receiving end of the collet and where the nut is axially elongated and provided with a seal means engaging the circumferential land.

In the preferred embodiment illustrated, the collet assembly is of the circumferentially spaced ball type and the nut is provided with an outer diameter groove intermediate its axial ends into which the balls may be projected by a moving cam face on a collet sleeve. The nut and collet assembly are so dimensioned that the balls engage in spaced relation to the open axial end of the collet assembly and the collet assembly is provided with a circumferential axially extending inner diameter land extending from the ball area to the open end. The nut is similarly provided with a circumferential outer diameter axially extending land from the ball receiving groove to an outer axial end face of the nut. A seal means is received in that area and engages the circumferential inner diameter land of the collet providing an effective seal at the open end of the collet outwardly of the gripping area.

Moreover, the axial elongation of the nut provides a relatively long axial seat area of the nut in the collet minimizing any tilting effect which could otherwise be provided.

In a further seal modification, an axially moveable O-ring seal member is received around the outer diameter of an inner sleeve of the collet assembly abutting an axial end face of the outer, moveable sleeve of the collet assembly remote from the open end. This seal seals the top axial end of the collet assembly without interferring with the axial moveability of the quick release feature.

It is therefore an object of this invention to provide an improved quick release tool holder and collet assembly.

It is more a specific object of this invention to provide a quick release tool holder-collet assembly wherein the tool holder is provided with an adjustable position nut engageable by the collet assembly to attach the tool holder to the collet assembly and wherein a seal means is provided between a nut receiving open end of the collet assembly and the nut.

It is yet another specific object of this invention to provide a quick release tool holder-collet assembly wherein the collet assembly has an axial open end receiving an adjustably positioned nut carried on a tool holder, the nut having a circumferential groove for engagement by collet assembly balls to maintain the nut in position in the open end of the collet assembly, the collet assembly having a circumferential land extending axially beyond the balls to the open end, and the nut having a second circumferential groove adjacent the ball receiving circumferential groove, the second circumferential groove carrying a seal means engaging the circumferential land, the collet assembly being actuatable to release the balls from engagement in the groove allowing the nut to be inserted and withdrawn through the open end.

It is a general object of this invention to provide a quick release tool holder-collet assembly utilizing an adjustable nut carried on the tool holder for engagement with gripping members of the collet assembly, the collet assembly being sealed at both axial ends when the nut is in position.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a side elevational exploded view of a tool holder-collet assembly according to this invention.

FIG. 2 is an enlarged longitudinal fragmentary sectional view of the assembly of FIG. 1 with the tool holder in position in the collet assembly.

FIG. 3 is a sectional view taken along the lines III-—III of FIG. 2.

FIG. 4 is a view similar to FIG. 2 illustrating insertion or removal of the tool holder.

DESCRIPTION OF THE PREFERRED EMBODIMENT

FIG. 1 illustrates, in an exploded view, a tool assembly of the type in which the present invention is utilized. The assembly, as is common in the art, is for the purpose of attaching a tool 10 to a spindle 11 in a manner which allows the tool to be quickly detached from the spindle. The assembly includes a device 12, commonly referred to as a spindle nose assembly, a device 13, commonly referred to as an adapter, and a device 14 for attaching the tool 10 to the adapter. For purposes of this document, the spindle nose assembly 12 is herein referred to as a collet assembly and the adapter 13 is herein referred to as a tool holder. It is to be understood that the tool 10 can be placed in the tool holder 13 in any desired manner, and, it is to be further understood that the tool holder 13 can, in some instances, be formed as a shank of the tool itself.

As illustrated in FIG. 2, the collet assembly 12 consists of an inner sleeve 16 attached to the spindle 11 by means such as screws 17 received in bores 18 in the sleeve 16 and threaded in bores 19 of the hollow spindle 11. The inner sleeve, in the embodiment illustrated, has a plurality of spaced bores 20 adjacent an axial open end 21 at the bottom of the sleeve 16. A plurality of balls 22 are received in the bores 20, and, as is known to those skilled in the art, the bores 20 may be tapered so as to retain the balls 22 to limit their radial inward movability. An outer sleeve 24 is received over the inner sleeve 16 and is movable with respect thereto. The outer sleeve also has a bottom open end 25 and an upper axial end 26. An adapter ring 27 is received adjacent the upper end 26 and may be held in place by means such as a C clamp 28 or the like. A ledge surface 30 projecting radially outwardly from the inner sleeve 16 forms an abutment for a spring 31 which has its other end abutted against the ring 27. In this manner, the spring 31 maintains the outer sleeve in an upward position on the inner sleeve. An undersurface of the ledge 30 abuts a radially inwardly extending projection 33 on the inner diameter of the outer sleeve to limit the upward movement of the outer sleeve. Below the projection 33, the outer sleeve has an inner diameter recess 34 which is joined to a reduced inner diameter section 35 adjacent the end 25 through a cam surface 36. The surface 35 may have an inner diameter substantially equal to the outer diameter of the inner sleeve adjacent the inner sleeve end 21 so as to maintain the outer sleeve concentric with the inner sleeve, a function which can also be accomplished by the ring 27.

It can therefore be seen that the outer sleeve is axially movable on the inner sleeve while the inner sleeve is attached to the spindle. When the outer sleeve is in its axially raised position as illustrated in FIG. 2, the surface 35 engages the balls 22 to force them radially inwardly. If desired, the cam surface 36 can be made longer such that when the balls 22 are in their fullest inward projection, they are engaged by the cam surface and not by the cylindrical surface 35, however, for other purposes, it is preferred that they rest on the cylindrical surface 35.

As illustrated in FIG. 4, if the outer sleeve 16 is drawn downwardly away from the spindle 11, the balls will lie radially inwardly of the relieved area 34 thereby allowing the balls to move radially outwardly into the relieved area.

The tool holder 13 has a threaded section 40 thereon which threadingly receives a nut 41. The nut 41 may be affixed in a given axial position on the threaded portion by means such as set screws 42. The nut 41 has spaced axial ends 43 and 44 with the axial end 43 being an abutting end dimensioned to abut the end of the spindle 11 when the nut is fully inserted into the collet assembly. The axial end 44, on the other hand, when the nut is fully inserted into the collet assembly lies adjacent the open end 50 of the collet assembly.

The nut is dimensioned to be received within the inner sleeve 16 with a very slight clearance relationship. A feature of this invention is that the nut is axially elongated and that the clearance of the nut to the inner sleeve is maintained small or at a zero clearance, such that the nut functions to maintain the tool holder 13 from tilting. The nut has a outer diameter groove 52 intermediate the axial ends which groove receives the balls 22 when the nut is fully seated against the spindle end and when the outer sleeve has moved to cam the balls radially inwardly.

It will be noted that the inner sleeve 16 has a circumferential axially extending inner diameter surface 60 which extends from the area of the ball apertures 20 to the open end 21. This surface cooperates with a seal 61 carried by the nut between the groove 52 and the nut axial end 44 to seal the open end 50 of the collet assembly. In the embodiment illustrated, the seal 61 is an O-ring seal received in a second groove 62 of the nut 41 intermediate the groove 52 and the axial end 44. The seal 62 effectively prevents entry of coolant fluid, dirt, abrasives and other foreign matter into the collet which could otherwise foul the balls 22 so that they will not move radially outwardly when the outer sleeve is moved to release them. Should that occur, it would be impossible to disengage the tool holder 13 from the collet and the entire collet assembly and tool holder would have to be removed from the spindle and be subjected to a joined together cleaning operation or to disassembly in order to free the balls. An advantage of this invention is that the seal 62 is on the nut and can therefore be checked for wear and quickly replaced. Moreover the seal is in use only when the particular tool holder is in use.

Further, in order to insure that the interior of the collet assembly is sealed, a second O-ring seal 70 is received around a projecting portion of the inner sleeve 16 which extends beyond the end 26 of the outer sleeve 24. The O-ring seal 70 is freely received around the outer diameter of the inner sleeve and is axially movable therealong. However, when the outer sleeve is in its raised position, illustrated in FIG. 2, the O-ring seal will engaged the axial end 26 of the outer sleeve sealing the juncture of the outer sleeve and inner sleeve. By maintaining the seal 70 axially movable on the inner sleeve, it can be assured that a seal will occur irrespective of whether the axial movement of the outer sleeve is limited by full seating of the balls 22 in their radially inward movement prior to the time the land 35 engages the balls. Should that occur, axial movement of the outer sleeve would stop at a point below that which would be normal. If the seal 70 were fixed in an axial position, it would not be possible to seal the axial end of the outer sleeve. In the embodiment illustrated, sealing can be assured by first drawing the outer sleeve downward with respect to the inner sleeve, then rolling the seal 70 down against the axial end of the outer sleeve. Thereafter release of the outer sleeve will push the seal 70 along with the movement of the outer sleeve to its locked position. At that point, the seal will be maintained since, preferably, the seal 70 is received around the inner sleeve in a state of tension.

It can be seen from the above that this invention provides a novel collet assembly seal where sealing is done at the open end of the assembly by a seal member carried by the tool holder nut which seal acts against an inner diameter land of the collet assembly between the gripping members of the collet assembly and the axial open end of the collet assembly and against an outer diameter surface of the nut between a nut gripping area and the axial end of the nut which will lie adjacent the open end of the collet assembly. Further, this invention describes a novel means of sealing between the inner and outer sleeves of the collet assembly at the end of the outer sleeve remote from the open tool receiving end.

Of course, modifications of the embodiment illustration will be readily apparent to those skilled in the art. For example, instead of using a ball collet as illustrated, axial spring fingers having inturned ends may be substituted as may be other known collet or gripping devices. Further, instead of the O-ring seal 60 illustrated, in certain embodiments a lip seal or chevron seal may be preferred. Additional modifications will be apparent to those skilled in the art.

Although the teachings of my invention have herein been discussed with reference to specific theories and embodiments, it is to be understood that these are by way of illustration only and that others may wish to utilize my invention in different designs or applications.

I claim as my invention

1. In an apparatus for quick change attachment of a tool to a spindle by means of a spindle carried collet assembly having a movable gripping means circumferentially engageable with a tool holder carried adjustable nut interior of the collet assembly adjacent an open end thereof, the nut being removable and insertable from the collet assembly through the open end upon movement of the gripping means from an engaged position to a disengaged position, the improvement of the nut having an outer diameter surface extending between spaced nut ends, a circumferential groove in said surface between said ends for receipt of said gripping members, a circumferential inner diameter land on said assembly between said gripping members and said open end, a seal means carried by said nut between said groove and one of said nut ends engaging the land and sealing the open end when the nut is inserted into the assembly with the one nut end adjacent the open end.

2. The apparatus of claim 1 wherein the nut has a second outer diameter circumferential groove intermediate the gripping members engageable groove and the one nut end, and the seal means has an O-ring seal received in said groove.

3. The assembly of claim 1 wherein the collet assembly has inner and outer relatively movable sleeves, movement of the outer sleeve causing movement of the gripping means from the engaged position to the disengaged position, the circumferential inner diameter land being on the inner sleeve.

4. In an apparatus for quick change attachment of a tool to a spindle by means of a spindle carried collet assembly having a movable gripping means circumferentially engageable with a tool holder carried adjustable nut interior of the collet assembly adjacent an open end thereof, the nut being removable and insertable from the collet assembly through the open end upon movement of the gripping means from an engaged position to a disengaged position, the improvement of the nut having an outer diameter surface extending between spaced nut ends, a circumferential groove in said surface between said ends for receipt of said gripping members, a circumferential inner diameter land on said assembly between said gripping members and said open end, a seal means carried by said nut between said groove and one of said nut ends engaging the land and sealing the open end when the nut is inserted into the assembly with the one nut end adjacent the inserted into the assembly with the one nut end adjacent the open end, wherein the inner sleeve is axially longer than the outer sleeve projecting beyond the outer slleve away from the open end, a second O-ring seal received around the inner sleeve exterior of the outer sleeve beyond a second axial end of the outer sleeve remote from the open end of the assembly, the second O-ring seal being axially movable on the inner sleeve under the influence of axial movement of the outer sleeve with respect to the inner sleeve, the second O-ring seal sealing between the outer surface of the inner sieeve and the second axial end of the outer sleeve.

5. A collet assembly for attaching tools to a spindle comprising a spindle carried collet assembly having an open axial end for receipt of a tool carried nut, movable gripper members interior of said collet assembly engageable and disengageable with a gripping area of said nut, said nut having an outer diameter extending between axial ends, the gripping area positioned between said axial ends and spaced from said axial ends, the collet having an inner diameter circumferential axially extending land extending from the gripping members to the open end, the nut having a surface opposed to said circumferential land when the nut is fully received in the collet assembly and gripped by the gripping members, a seal means carried by the nut at said surface engaging the land and sealing the space between the nut and the land at the open end.

* * * * *